US012764147B2

(12) United States Patent
Shubov et al.

(10) Patent No.: US 12,764,147 B2
(45) Date of Patent: Oct. 13, 2026

(54) METHODS AND SYSTEMS OF CORRELATING NETWORK ATTACKS WITH NETWORK ELEMENT BEHAVIOR

(71) Applicant: CYMOTIVE TECHNOLOGIES LTD., Tel Aviv (IL)

(72) Inventors: Eugene Shubov, Modiin (IL); Alon Ashkenazi, Rosh Haayin (IL)

(73) Assignee: CYMOTIVE TECHNOLOGIES LTD., Tel Aviv (IL)

( * ) Notice: Subject to any disclaimer, the term of this patent is extended or adjusted under 35 U.S.C. 154(b) by 44 days.

(21) Appl. No.: 18/699,390

(22) PCT Filed: Oct. 6, 2022

(86) PCT No.: PCT/IL2022/051065
§ 371 (c)(1),
(2) Date: Apr. 8, 2024

(87) PCT Pub. No.: WO2023/058026
PCT Pub. Date: Apr. 13, 2023

(65) Prior Publication Data
US 2024/0430284 A1 Dec. 26, 2024

Related U.S. Application Data

(60) Provisional application No. 63/253,577, filed on Oct. 8, 2021.

(51) Int. Cl.
*H04L 9/40* (2022.01)
*G06F 21/57* (2013.01)

(52) U.S. Cl.
CPC ........ *H04L 63/1425* (2013.01); *G06F 21/577* (2013.01); *H04L 63/1416* (2013.01); *H04L 63/1433* (2013.01)

(58) Field of Classification Search
None
See application file for complete search history.

(56) References Cited

U.S. PATENT DOCUMENTS 9,210,181 B1 * 12/2015 Nandy ................ H04L 63/1416
10,469,511 B2 * 11/2019 Vasseur ................... H04L 43/14
(Continued)

FOREIGN PATENT DOCUMENTS

WO WO-2020261262 A1 * 12/2020 ......... H04L 63/1433
WO 2021/034906 A1 2/2021

OTHER PUBLICATIONS

Written Opinion received for PCT Application No. PCT/IL2022/051065, mailed on Feb. 1, 2023, 26 pages.
(Continued)

*Primary Examiner* — Lashonda Jacobs-Burton
(74) *Attorney, Agent, or Firm* — NIXON & VANDERHYE

(57) ABSTRACT

Embodiments of the present disclosure include a method of analyzing the results of a network attack function within an IoT environment, for example a vehicular, residential, or industrial computing environment including two or more network elements each with at least one known parameter, the method including a) executing one or more network attack functions against two or more known network elements; b) analyzing results of at least one network attack function to identify anomalous behavior of at least one network element; and c) correlating the identified anomalous behavior of the at least one network element with a specific network attack function permutation and with at least one parameter of the specific network element. In some embodiments, the one or more network attack functions includes a set of attack function permutations.

20 Claims, 12 Drawing Sheets

(56) References Cited

U.S. PATENT DOCUMENTS

| | | | | |
|---|---|---|---|---|
| 11,876,815 | B2 * | 1/2024 | Maha | H04L 41/147 |
| 2011/0231935 | A1 * | 9/2011 | Gula | G06F 21/00 709/224 |
| 2016/0182560 | A1 * | 6/2016 | Fleischman | H04L 63/1458 726/23 |
| 2016/0277433 | A1 * | 9/2016 | Neil | G06N 5/045 |
| 2017/0223037 | A1 | 8/2017 | Singh et al. | |
| 2019/0044912 | A1 | 2/2019 | Yang et al. | |
| 2019/0111863 | A1 | 4/2019 | Ben Noon et al. | |
| 2020/0314128 | A1 * | 10/2020 | Hild | H04L 63/1416 |
| 2021/0067553 | A1 | 3/2021 | Ries et al. | |
| 2021/0281590 | A1 | 9/2021 | Maha | |
| 2022/0239690 | A1 * | 7/2022 | Arnon | H04L 69/22 |
| 2022/0321397 | A1 * | 10/2022 | Tormasov | H04L 41/0627 |

OTHER PUBLICATIONS

International Search Report received for PCT Application No. PCT/IL2022/051065, mailed on Feb. 1, 2023, 3 pages.

* cited by examiner

METHODS AND SYSTEMS OF CORRELATING NETWORK ATTACKS WITH NETWORK ELEMENT BEHAVIOR

CROSS-REFERENCE TO RELATED APPLICATION

This application is a U.S. national phase application of a PCT Application No. PCT/IL2022/051065 filed on Oct. 6, 2022, which claims priority to U.S. Provisional Patent Application No. 63/253,577 filed on Oct. 8, 2021, titled "METHODS AND SYSTEMS OF CORRELATING NETWORK ATTACKS WITH NETWORK ELEMENT BEHAVIOR" which are hereby incorporated by reference in its entirety.

TECHNICAL FIELD

The subject matter herein relates to data capture and data handling techniques.

BRIEF SUMMARY

Embodiments of the present disclosure include a method of analyzing the results of one or more network attack functions within a vehicular computing environment including two or more network elements each with at least one known parameter, the method including a) executing one or more network attack functions against two or more known network elements; b) analyzing results of at least one network attack function to identify anomalous behavior of at least one network element; and c) correlating the identified anomalous behavior of the at least one network element with a specific network attack function permutation and with at least one parameter of the specific network element. In some embodiments, the one or more network attack functions includes a set of attack function permutations.

In some embodiments, a network element may include a single device, a plurality of devices, one or more network nodes, one or more databases, one or more lines of computer code, one or more processors, one or more communications elements, or one or more memory elements. In some embodiments, the plurality of network elements include simulated network elements that reside on a simulated vehicular computing environment.

In some embodiments, the plurality of network elements include emulated network elements that reside on an emulated vehicular computing environment. In some embodiments, the plurality of network elements reside on a physical network. In some embodiments, the plurality of network elements reside in a hybrid environment. In some embodiments, the hybrid environment may include at least a combination of at least two of a physical network element, a simulated network element, or an emulated network element.

In some embodiments, the plurality of network elements includes an infrastructure monitoring service that can interact with one or more network elements. In some embodiments, at least one parameter of a specific network element is stored in a database. In some embodiments, at least one parameter of a specific network element is used for further system validation. In some embodiments, the plurality of network elements includes at least one backend service.

In some embodiments, the plurality of network elements includes at least one web service. In some embodiments, the plurality of network elements includes at least one mobile device platform. In some embodiments, the plurality of network elements includes at least one messaging service that can interact with one or more network elements. In some embodiments, the plurality of network elements includes a compute service that can interact with one or more network elements.

In some embodiments, the plurality of network elements includes an authentication service that can interact with one or more network elements. In some embodiments, the vehicular computing environment is integrated with an external computing environment. In some embodiments, the backend service is a fleet management service. In some embodiments, the backend service is hosted by one or more cloud services providers.

In some embodiments, the backend service is hosted using an on-premises hosting solution. In some embodiments, the backend service is hosted using a combination of one or more cloud service providers and an on-premises hosting solution. In some embodiments, the web service is hosted by one or more cloud services providers. In some embodiments, the web service is hosted using an on-premises hosting solution.

In some embodiments, the web service is hosted using a combination of one or more cloud service providers and an on-premises hosting solution. In some embodiments, the web service includes an API gateway that can interact with one or more network elements. In some embodiments, the web service one or more microservices that can interact with one or more network elements. In some embodiments, the at least one a mobile device platform includes an iOS application or an Android application.

In some embodiments, the messaging service includes at least one of a messaging client, persistent connection, a central messaging broker, or a polling interval. In some embodiments, the compute service is a serverless compute service that can interact with one or more network elements. In some embodiments, the authentication service is a mutual authentication service that can interact with one or more network elements.

Embodiments may also include connection with an external computing environment. In some embodiments, the external computing environment is part of a developer operations environment associated with continuous integration. In some embodiments, the external computing environment is part of a developer operations environment associated with continuous delivery. In some embodiments, the external computing environment is part of a developer operations environment associated with continuous deployment.

In some embodiments, the executed network attack function permutation may include at least one of a manual request from a human, an automated request according to a request schedule, an automated request generated by machine learning, and an artificial intelligence analysis. In some embodiments, the at least one attack function permutation may include a logical addresses for each of the plurality of network elements.

In some embodiments, the at least one attack function permutation may include at least one characteristic for each of the plurality of network elements. In some embodiments, the at least one attack function permutation may include at least one of a duration of time to form at least one attack function, a predicted run time to execute at least one attack function, a requirement to comply with a performance specification of an attack function, or an attack function network route.

In some embodiments, the at least one attack function is initiated via a batch process. In some embodiments, the at least one attack function is initiated via a near-real time streaming process. In some embodiments, the at least one attack function utilizes a messaging protocol. In some embodiments, the at least one attack function is targeting a frontend emulator. In some embodiments, the at least one attack function is based at least in part on a previously derived attack function permutation.

In some embodiments, the at least one attack function is based at least in part on a previously executed attack function permutation. In some embodiments, the at least one attack function permutations may also include one or more attack payloads. In some embodiments, the network attack function was created by an artificial intelligence system. In some embodiments, the at least one executed network attack function is executed against a plurality of network elements at the application layer.

In some embodiments, the network attack function was created by a human operator. In some embodiments, the network attack function was created by combination of an artificial intelligence system and a human operator. In some embodiments, the network attack function includes information obtained from an external computing environment including third party data sources. In some embodiments, the network attack function includes randomly generated information.

In some embodiments, the at least one attack function utilizes a communication protocol. In some embodiments, the at least one attack function utilizes a web services protocol. In some embodiments, the at least one attack function permutation may include interaction with at least one of a private database, a public database, or a network element-specific database. In some embodiments, the at least one attack function permutation is at least partially informed by previously obtained correlation results related to a network element.

In some embodiments, the communication protocol is full-duplex. In some embodiments, the communication protocol is stateless. In some embodiments, the web services protocol is full-duplex. In some embodiments, the web services protocol provides identity verification through intermediaries. In some embodiments, the web services protocol provides point-to-point identity verification. In some embodiments, the interaction includes at least one each of a read function and a write function with at least one of a private database, a public database, or a network element-specific database.

In some embodiments, the previously obtained correlation results indicates the relevance of at least one of a cross-site scripting attack, and out of range integer value, a JSON injection, an enormous field repetition, a specially crafted string, a nullbyte, an SQL injection, an illegal character, or a business logic attack. In some embodiments, analyzing results of at least one attack function may include at least one of a manual request from a human, an automated request according to a request schedule, an automated request generated by machine learning, and an automated request generated by artificial intelligence analysis.

In some embodiments, analyzing the results of at least one attack function includes the use of an artificial intelligence system. In some embodiments, analyzing the results of at least one attack function includes the use of a supervised learning operation. In some embodiments, analyzing results of at least one attack function includes a user interface adapted for visual analysis by a human operator.

In some embodiments, analyzing results of at least one attack function includes analysis by an artificial intelligence system and approval by a human operator. In some embodiments, the analyzing results of at least one attack function includes analysis by a human operator and an artificial intelligence algorithm. In some embodiments, analyzing results of at least one attack function includes using results from previously analysis sessions.

In some embodiments, the analyzing results of at least one attack function includes transmitting the analysis results to one or more network elements within an Internet of Things (IoT) computing environment. In some embodiments, the analyzing results of at least one attack function includes transmitting the analysis results to one or more network elements within the vehicular computing environment. In some embodiments, the analyzing results of at least one attack function includes transmitting the analysis results to a network element located in an external computing environment. In some embodiments, analyzing results of at least one attack function includes storing the analysis results within one or more network elements located in the vehicular computing environment.

In some embodiments, analyzing results of at least one attack function includes storing the analysis results in a network element located in an external computing environment. In some embodiments, correlating the identified anomalous behavior includes the usage of an artificial intelligence system. In some embodiments, correlating the identified anomalous behavior includes an artificial intelligence algorithm.

In some embodiments, correlating the identified anomalous behavior is performed by a human operator. In some embodiments, correlating the identified anomalous behavior includes the use of a set of predefined and updatable rules to detect anomalous behavior. In some embodiments, correlating the identified anomalous behavior is performed by a human operator aided by an artificial intelligence system.

In some embodiments, correlating the identified anomalous behavior is performed by a human operator and an artificial intelligence algorithm. In some embodiments, correlating the identified anomalous behavior includes previously obtained correlation results. In some embodiments, correlating the identified anomalous behavior includes transferring the results of the correlation activity to one or more network elements within a vehicular computing environment.

In some embodiments, correlating the identified anomalous behavior includes transferring the results of the correlation activity to an external computer network. In some embodiments, correlating the identified anomalous behavior includes storing the results of the correlation activity to one or more network elements within the vehicular computing environment. In some embodiments, correlating the identified anomalous behavior includes storing the results of the correlation activity to an external computer network.

In some embodiments, correlating the identified anomalous behavior includes sending the results of the correlation activity to an exploits database. In some embodiments, correlating the identified anomalous behavior includes correlating the original attack generator request with the identified anomalous behavior. In some embodiments, correlating the identified anomalous behavior includes correlating the original request from the backend service with the identified anomalous behavior.

In some embodiments, correlating the identified anomalous behavior includes correlating a network attack function targeting a backend service with the identified anomalous behavior. In some embodiments, correlating the identified anomalous behavior includes correlating a network attack function targeting a web service with the identified anomalous behavior. In some embodiments, correlating the identified anomalous behavior includes correlating a network attack function targeting a mobile device platform with the identified anomalous behavior.

In some embodiments, correlating the identified anomalous behavior includes correlating a network attack function targeting a messaging service with the identified anomalous behavior. In some embodiments, correlating the identified anomalous behavior includes correlating a network attack function targeting an authentication service with the identified anomalous behavior. In some embodiments, correlating the identified anomalous behavior includes correlating a network attack function targeting a compute service with the identified anomalous behavior.

In some embodiments, correlating the identified anomalous behavior includes sending the results of the correlation activity to an attack function generator. In some embodiments, correlating the identified anomalous behavior includes correlating at least one known exploit from an exploits database with the identified anomalous behavior. In some embodiments, sending the results of the correlation activity to an attack function generator result in the generation of an additional attack function permutation. Embodiments may also include when the exploits database is a database external to the vehicle computing environment.

BACKGROUND

Vehicular computing networks are inseparable components of a smart city environment due to several applications that improve the quality of life, safety, and security. Applications of vehicular networks vary from safety applications such as blind spot warning and traffic light violations to entertainment such as streaming media or convenience such as parking space identification. Vehicular networks are mainly composed of vehicle nodes, which behave quite differently from other wireless nodes. Therefore, a vehicular network has several characteristics that may affect the design of Internet of Vehicles (IoV) technologies. Some of the characteristics will bring challenges to IoV technological development. More often, vehicular computing networks and systems are susceptible to hacking and unauthorized accesses via their vulnerable points, leading to adverse outcomes. Network security systems in vogue perform manual inspection or network scans as a part of vulnerability analysis to identify and safeguard such weak points in the network. For instance, network scanners would transmit package of messages to the devices in the network, receive their responses packets, and then cross-check and audit those responses. This puts a limit to the performance of such network scanners because devices which aren't actively communicating with these scanners, will escape the process. This is more difficult in a network associated with a vehicular computing system. For example, when the networked devices or networked sensors are housed within different types of vehicles, the differences in vehicle types can complicate the audit. Further complicating matters are instances in which each of the networked devices or networked sensors transmit network communications from multiple routers, hosts and other network devices distributed over a large geographical area. The wide area IoT environments themselves and mobile nature of the sensors hinder a thorough audit by active vulnerability scanners. In these IoT environments, vulnerability scanners may also miss network activity when some ports and routers are inactive or when transmitted and received messages are screened behind firewalls.

Thus, active vulnerability scanners often cannot dig out exhaustive information of a network such as security configurations and settings. Consequently, such scanners fail to detect network breaches in real-time if intruders resort to network-obscuring tactics such as the use of non-standard ports and custom protocols in several backdoor and rootkit applications. Scanning the network for possible breaches requires real-time monitoring which is beyond the scope of active vulnerability scanners, putting them at a serious disadvantage in terms of identifying potential vulnerabilities in the network, or building models or topologies for the network. Moreover, vehicular network has highly dynamic topology. Compared to common mobile nodes, vehicles may move at quite a high speed. This causes the topology of a vehicular network to change frequently. Such high dynamicity in network topology must be carefully considered in during scanning. Vehicular network has variable density depending on the traffic density, which can be very high in the case of a traffic jam, or very low, as in suburban traffic. At either extreme the network may frequently disconnect. Further, the network scale could be large in dense, urban areas, such as city centers, highways, and at entrances to big cities. Compared to other networks that use unicast (e.g., one sender is connected to one receiver) or multicast where the communication endpoints are defined by ID or group ID, the vehicular networks often have a new type of communication, which addresses the geographical areas where packets need to be forwarded (eg, in safe-driving applications). Vehicular networks also differ from other types of mobile ad-hoc networks in which nodes move randomly. Vehicles, on the other hand, are constrained by road topology and layout, by the requirement to obey road signs and traffic lights, and by responding to other moving vehicles, leading to predictability in terms of their mobility. Further, vehicular networks are usually operated in two typical communication environments. In highway traffic scenarios, the environment is relatively simple and straightforward (eg, constrained one-dimensional movement), whereas in city conditions it becomes much more complex. The streets in a city are often separated by buildings, trees, and other obstacles; therefore, there is not always a direct line of communication in the direction of intended data communication.

The aforementioned limitations may prevent active vulnerability scanners from monitoring certain hosts and devices which are participating in network sessions. To mitigate this issue, in various security systems, one or multiple passive vulnerability scanners are used in tandem with their active counterparts to scan and monitor traffic in the network so that both types of scanners complement each other. The challenge associated with this approach is the difficulty in parsing the huge volume of data generated and addressing the large number of vulnerabilities identified. Particularly, network topologies with thousands of nodes and loops may pose a significant challenge in terms of adequate representation that offers visibility into the network. Since resources are usually limited across most organizations, scheduled patch deployment as against a real-time deployment is what is viable in the context of addressing the vulnerabilities. This could make it challenging to identify high-profile and/or high-risk client networks which are susceptible to network and server intrusions.

Several drawbacks however plague the traditional network modelling solutions within an IoT environment. For example, in an IoT environment like a vehicle; a vehicular computing platform may be fully patched for instance but administered from a computing device which accesses the internet in an unprotected mode, such as by using an unpatched web browser. This may lead to vulnerabilities going undetected under aforementioned techniques. While the example of a vehicular computing platform is provided, IoT environments are becoming ubiquitous across a number of environments including oil & gas prospecting, refinement and recovery. The same can be said of mining across its value chain of surveying, planning, recovery of resources, the refinement process, for example milling, and blending where IoT sensors and field processing are increasing in popularity. In such environments, key activities where sensor data is relayed to servers for interpretation, boundary detection, and updated ore body knowledge (OBK), environmental sensors are often managed by contractors and company employees where user behavior and devices vary considerably in network security practices. For example, outdated configurations of traffic management systems including firewalls, switches and routers will escape vulnerability modelling in terms of reflecting the current network configuration state. This is further complicated by the fact that some systems may have flat configurations wherein every system can access to every other system within the firewall, providing a sharp contrast to other types where only the admin for instance, can access the servers. In IoT environments, such as mining, transport and logistics, aerospace, vehicles, construction, and property management, various permutations and combinations of client-side and server-side exploits are beyond the scope of current server-centric vulnerability modelling systems.

Thus, there is a requirement for a network security system that can monitor and predict the entire spectrum of security threats and weak points in a vehicular computing network including those that correspond to remotely and/or internally accessible susceptibilities covering services, client software and trust relationships. Further, the hack paths and possible intrusion approaches need to be simulated in a security system so as to thwart any possible security breaches on those vulnerable points.

DETAILED DESCRIPTION

Figure 1:
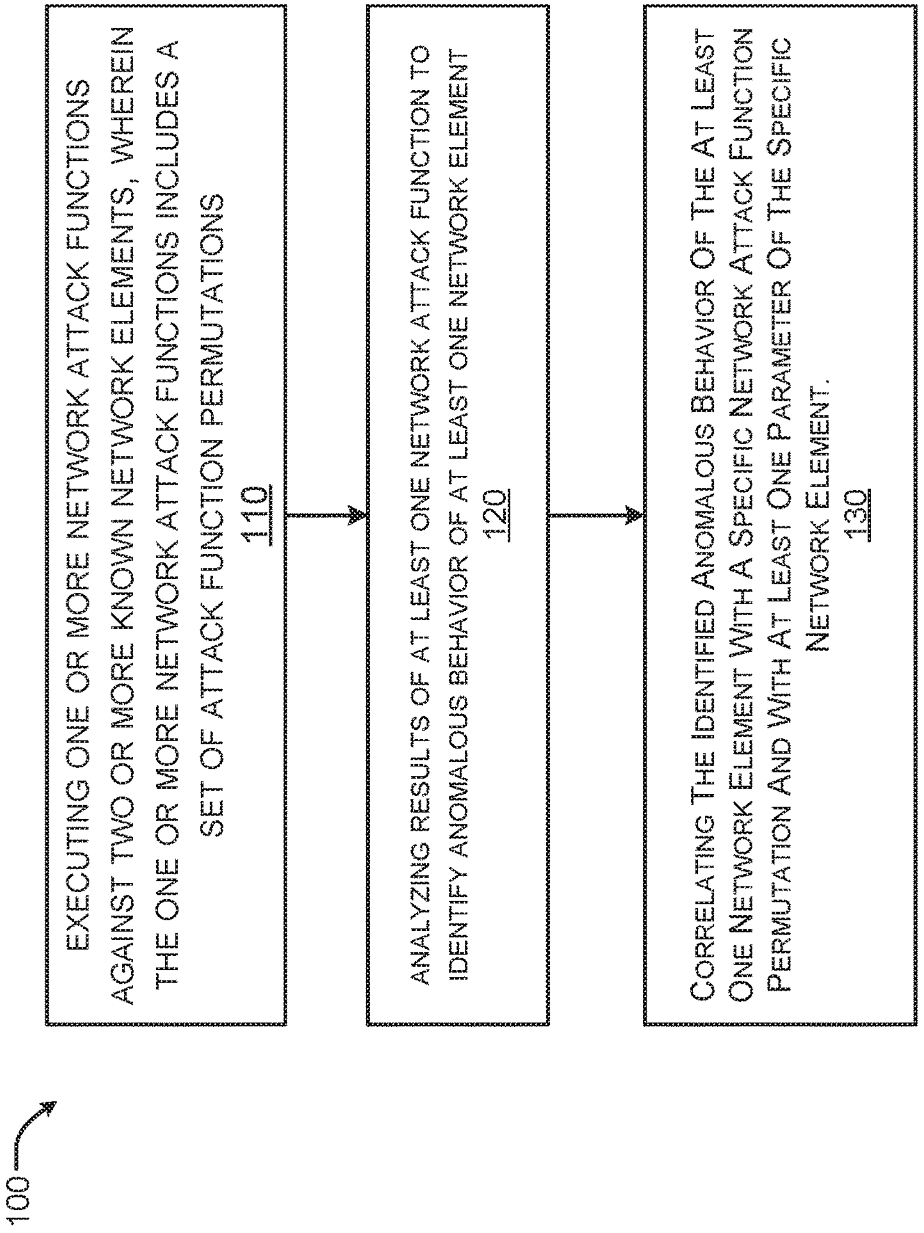
FIG. 1 depicts a high-level logic flow of an operational process for analyzing the results of one or more network attack functions within a vehicular computing environment serving as an exemplary IoT environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

In the present invention, one or more network attack functions may be generated by a vehicular computing environment (VCE). The VCE may be any physical, simulated or emulated environment where one or more network elements may be tested for cybersecurity anomalies. Alternatively, the VCE may reside in a hybrid environment that may include at least a combination of at least two of a physical network element, simulated network elements, or emulated network elements. The VCE may also be integrated with an external computing environment. While network attack functions may be generated by a VCE, it will be appreciated that network attack functions may be generated. Non-limiting examples of generated network attack function include "from vehicle to mobile," "from mobile to vehicle," "from vehicle to itself," "from vehicle to other vehicles," and using multi-stage attacks that are generated dynamically according to the received responses.

The one or more network elements may include a single device, a plurality of devices, one or more network nodes, one or more databases, one or more lines of computer code, one or more processors, one or more communications elements, or one or more memory elements. At times, a front end and a backend of a network connected device are treated as individual network elements. For example, a network connected device, such as a vehicle may include a first network element such as a vehicle front end interface and the vehicle backend a second network element. The network attack functions may be extracted from the memory of the device in the VCE. All of the data from all of the devices within the specified system may be placed into a single, cloud-based data lake. This data lake could be housed within the confines of a public cloud provider such as Microsoft or Amazon, a private cloud environment, or a hybrid environment using some aspects of both a public and private cloud network.

Within the cloud infrastructure are multiple algorithms, including one that can generate network attack function that may be a coded structure containing one or more attack function permutations. The network attack function may be executed within the VCE and is typically focused on one or more network elements. At a high level, the process may be performed using an attack function permutation generation that is designed to elicit a response from one or more network elements in conjunction with a data lake. The data lake may comprise an attack payload having a combination of all attack function permutations within a network attack function or network attack.

Alternatively, the executed network attack function permutation comprises at least one of a manual request from a human, an automated request according to a request schedule, an automated request generated by machine learning, and an artificial intelligence analysis. The attack function permutation comprises a logical addresses for each of the plurality of network elements.

The attack function permutation may further include at least one characteristic for each of the plurality of network elements, at least one of a duration of time to form at least one attack function, a predicted run time to execute at least one attack function, a requirement to comply with a performance specification of an attack function, or an attack function network route but not limited to the like. Or alternatively, the network attack function may include randomly generated information.

The data lake may store at least one parameter of a specific network element. For example, the parameter may comprise a characteristic in software, hardware, or firmware that helps define a network attack or network element. In both cases, the intent of a parameter is to evoke a response within the VCE such that anomalous behavior can be identified and correlated to that parameter. For example, a characteristic that triggers an anomalous response to some input. The one or more parameters may also be required for system validation. The data lake may also be associated with a private database, a public database, or a network element-specific database. For example, the database may include a result and analysis database, an exploit database, an attack database and the like.

Examples of network elements associated with the VCE may include an infrastructure monitoring service that can interact with one or more network elements, at least one web service, at least one mobile device platform, at least one messaging service that can interact with one or more network elements, a compute service that can interact with one or more network elements, an authentication service that can interact with one or more network elements and the like.

The infrastructure monitoring service may include a vehicle emulator (VE) that may be designed to emulate, without limitation, vehicle operating systems, memory systems, data systems, processing systems, or communications systems.

Alternatively, the infrastructure monitoring service may further include a frontend emulator (FE) that may be designed to emulate the frontend of a system, typically the client or visual elements of an application or service.

The backend service may comprise a management system (interchangeably referred to as the fleet management system) designed to manage vehicles, including but not limited to cars, trucks, boats, ships, airplanes, rail cars, generators, and the like. The backend service may be hosted by one or more cloud services providers, an on-premises hosting solution or a combination of one or more cloud service providers and an on-premises hosting solution.

The web service may further include an API gateway that can interact with one or more network elements, one or more microservices such as MQTT services, REST services, Cloud watch logs and the like.

Alternatively, the mobile device platform may include but not limited to an iOS application or an Android application. The messaging service may include at least one of a messaging client, persistent connection, a central messaging broker, or a polling interval.

The compute service may be a serverless compute service that can interact with one or more network elements while the authentication service may be a mutual authentication service that can interact with one or more network elements.

The external computing environment may be a part of a developer operations environment associated with but not limited to continuous integration, continuous delivery, continuous deployment, or a combination thereof.

FIG. 1 shows an exemplary method according to some embodiments of the present disclosure. According to FIG. 1, a method of analyzing the results of a network attack function within a vehicular computing environment including two or more network elements each with at least one known parameter, the method including 110 to 130. At 110, the method may include executing one or more network attack functions against two or more known network elements. The one or more network attack functions may include a set of attack function permutations. At 120, the method may include analyzing results of at least one network attack function to identify anomalous behavior of at least one network element. Furthermore, at 130, the method may include correlating the identified anomalous behavior of the at least one network element with a specific network attack function permutation and with at least one parameter of the specific network element.

Figure 2A:
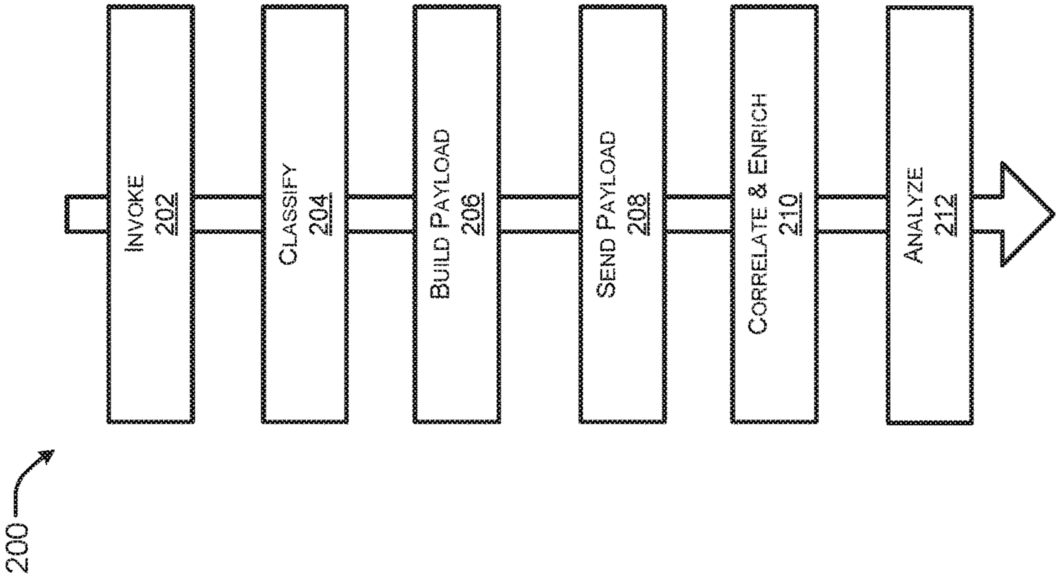
FIG. 2A depicts additional exemplary operations in a high-level logic flow of the operational process analyzing the results of one or more network attack functions within the vehicular computing environment.
Figure 2B:
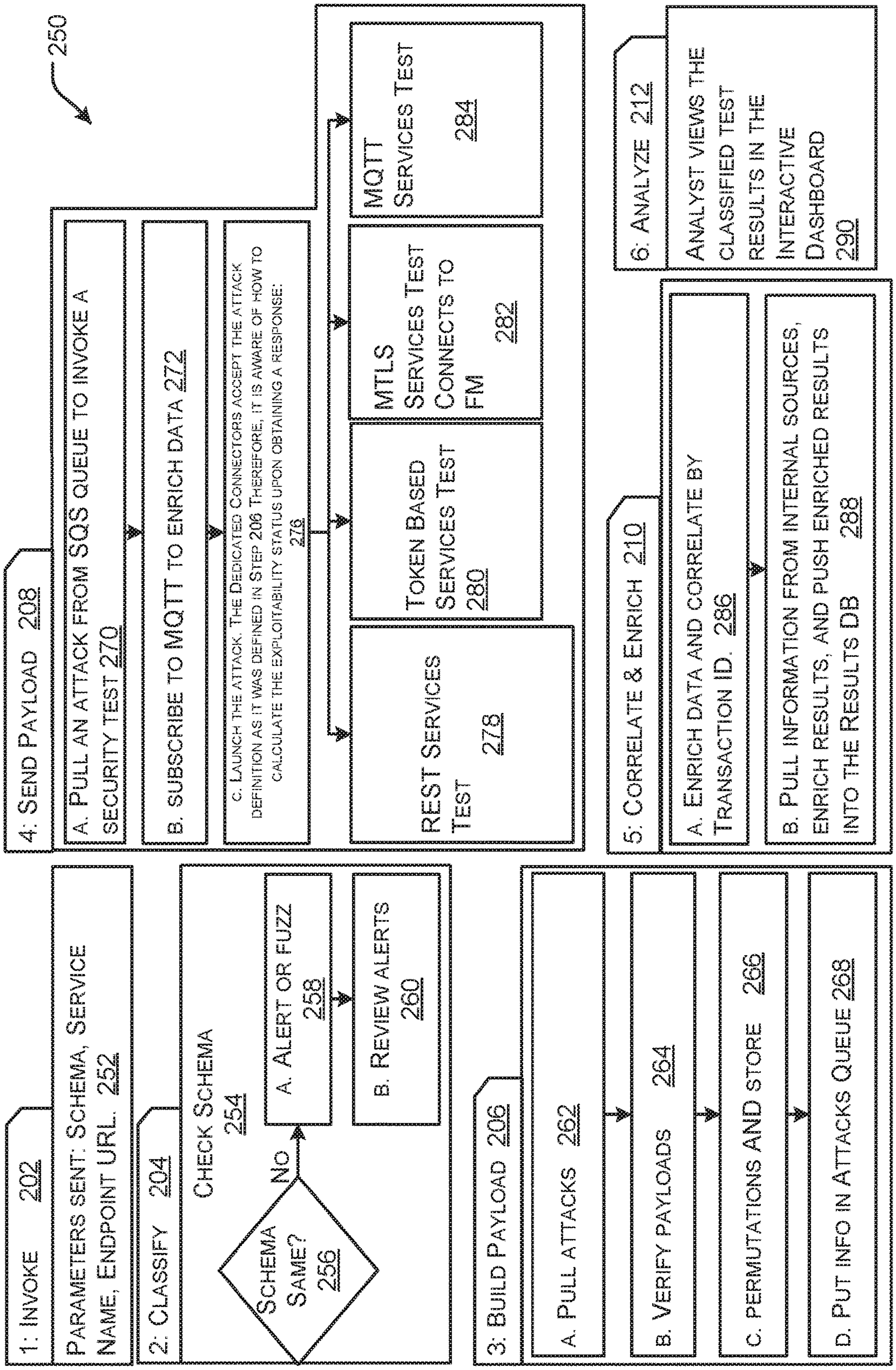
FIG. 2B depicts a detailed operational flow diagram designed to enable analyzing the results of one or more network attack functions within the vehicular computing environment.

FIGS. 2A and 2B show another exemplary method according to some embodiments of the present disclosure. In some embodiments, the method includes one or more steps in addition to 110 to 130 that complements the steps described in FIG. 1.

At 202, the method may include invoking an attack function that may be initiated via any or a combination of a batch process, a near-real time streaming process. The invocation may occur from an external source or a manual call. The attack function may utilize a messaging protocol/service from an external source upon receiving at 252, an update to a service, or manual call to send at least one parameter. The messaging service may include at least one of a messaging client, persistent connection, a central messaging broker, or a polling interval.

The at least one parameter received by utilizing a messaging service may include but not limited to schema, service name, Endpoint URL and the like. At 204, the method may include classifying the at least one parameter into two or more categories. For example, classifying the at least one parameter may include a check 254, e.g., checking if the schema exists and is the same as the definition in a service definitions S3 repository. If the schema is not the same at 256, then the method may include at 258 alerting to an authentication service (interchangeably referred to as the audit log hereinafter) or trying to only fuzz fields. The audit log may store alerts and actions needed by an analyst such as new Schema definition found, new category found and the like and then authorize or audit access to the VCE to a user.

At 260, the method may then include modifying the alerts for new services by the analyst. At 206, the method may include building a payload that further includes the steps of pulling attacks from an attack database at 262 to a Dedicated Payload Builder. The attack definition contains a logic of exploit verification and ranking services that provides identity verification through intermediaries or point-to-point identity verification or a combination thereof. Therefore, at 264, the method includes verifying existence of payloads in generated permutations and then at 266, generating the needed permutations and storing the generated permutations. Hence at 268, a combination of payloads, endpoints and service information in may be put in an SQS Attacks Queue.

Furthermore, at 208, the method may include sending the payload by pulling at 270 an attack from the SQS Attacks Queue and queuing in order to invoke a security test against the relevant endpoint, and by establishing at 272, a subscription to MQTT to enrich data upon receiving a response. At 274, the method may include launching the attack function through the dedicated connectors and accept the attack definition as it was defined in 206 thereby calculating the exploitability status upon obtaining the response. The method at 208, may include a REST Services Test at 278 that may invoke Subscribe to MQTT on the relevant topic and VIN, send test as frontend (REST to Service Platform), and insert results to a results database. The method at 208, may include a variety of service tests such as Token Based Services Test at 280 that may connect to the Fleet Management with the relevant token for the required service and may also include a MTLS Services Test at 282 that may connect to the Fleet Management via MTLS and may further include a MQTT Services Test at 284 that may connect to the Fleet Management via a combination of MQTT and MTLS for all vehicle related services to identify anomalous behavior behavior.

The method may include at 210, correlating the identified anomalous behavior may include usage of an artificial intelligence system through an artificial intelligence algorithm or may be performed by a human operator or a combination thereof.

Alternatively, correlating the identified anomalous behavior may include the use of a set of predefined and updatable rules to detect anomalous behavior and further include previously obtained correlation results. For example, at 286, the identified anomalous behavior may be enriched upon receiving the response and the response data may be correlated with corresponding request by means of a Transaction ID. The method at 210, may further include pulling at 288 information from various internal sources by logging into thee accounts such as Fleet Management CloudWatch, X-Ray, after the end of a test batch, enrich results based on the obtained information, and pushing enriched results into the results database.

The method may further include at 212 analyzing the classified results by an analyst by viewing in an interactive Dashboard. The interactive dashboard may provide interaction by including at least one each of a read function and a write function with at least one of a private database, a public database, or a network element-specific database. For example, the database may include a result and analysis database, an exploit database, an attack database and the like.

In an embodiment, analyzing the results of at least one attack function may include the use of but not limited to an artificial intelligence system, a supervised learning operation, a user interface adapted for visual analysis by a human operator such as the interactive dashboard but not limited to it. The approval of the analysis may be provided by the artificial intelligence system or the human operator (also referred to as the analyst) or a combination thereof. The analysis results may be referred from previously analysis sessions.

The classified results may be further transmitted or stored or a combination thereof to one or more network elements within the vehicular computing environment, or to a network element located in an external computing environment or a combination thereof.

Figure 3:
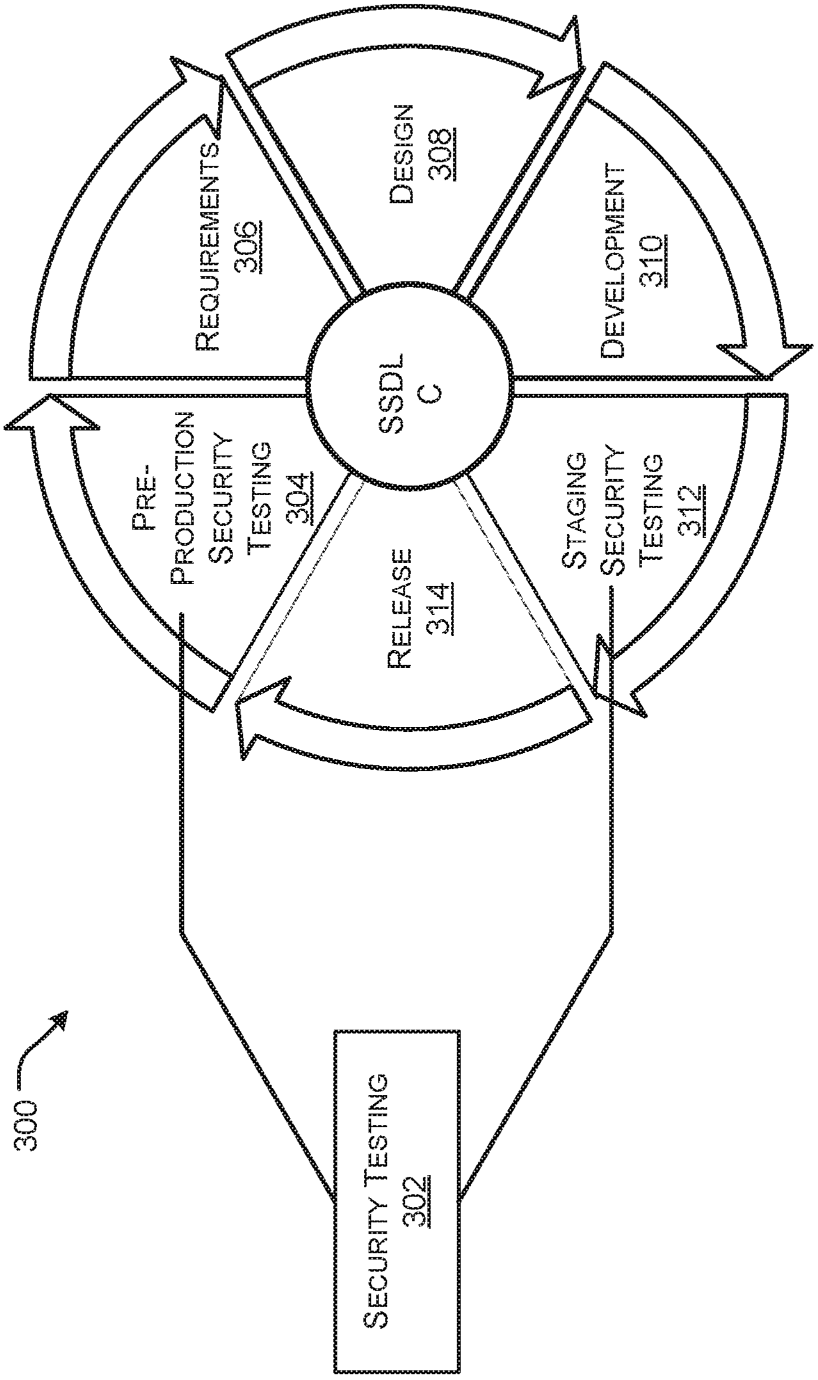
FIG. 3 depicts an example representation of a security module for analyzing the results of one or more network attack functions within the vehicular computing environment.

FIG. 3 depicts an example representation of an infrastructure monitoring service for analyzing the results of one or more network attack functions within the vehicular computing environment. According to FIG. 3, the infrastructure monitoring service may be a cyclic process that may include at 302 a security testing service that may enable staging security testing at 312 then release the test results at 314 followed by pre-production security testing that are fed to a requirement service section at 306. The cyclic process may further include design at 308 and development service at 310 which may again be provided to the staging security testing service at 312.

Figure 4:
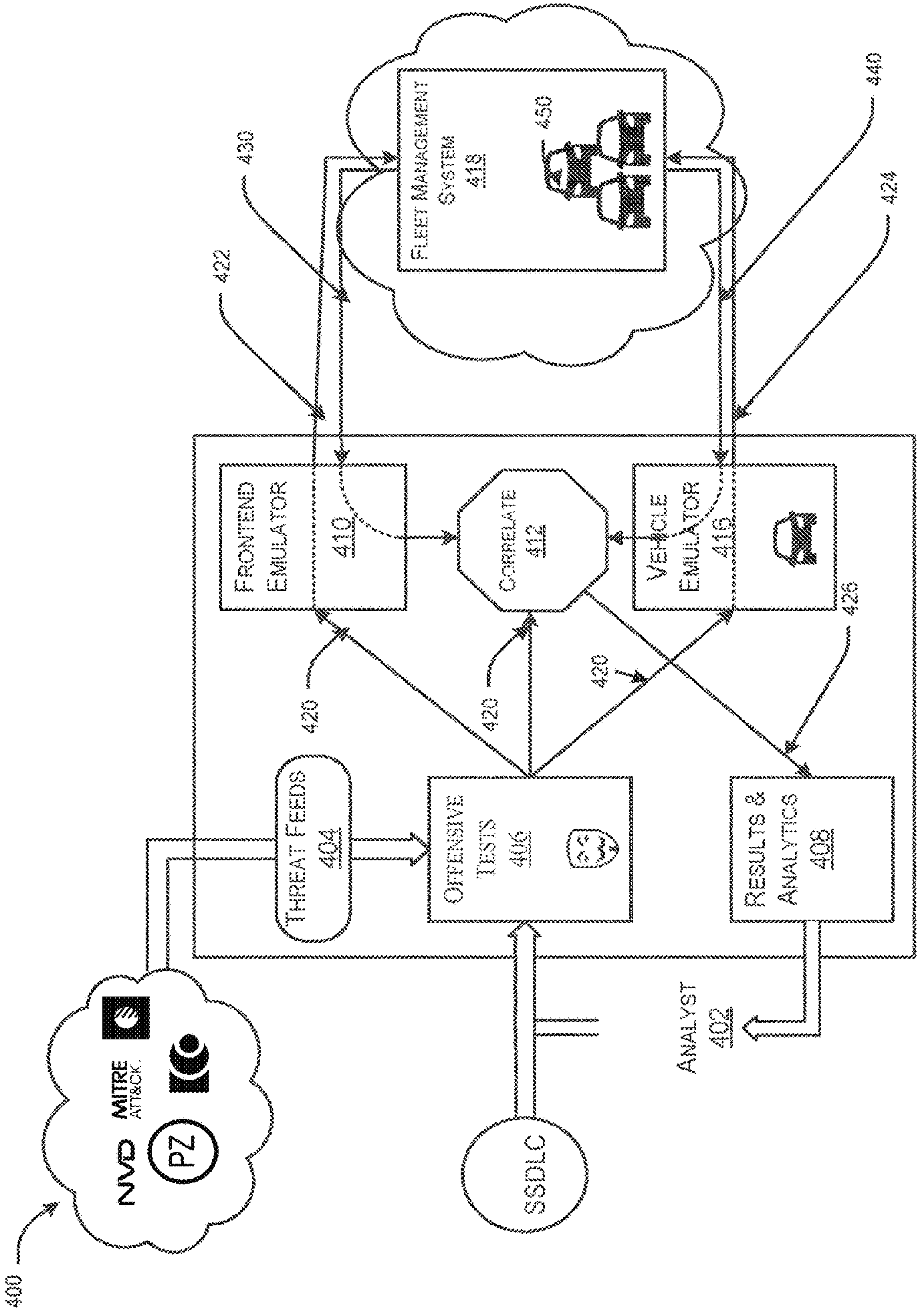
FIG. 4 depicts an example system architecture comprising the security module.

FIG. 4 depicts an example system architecture comprising the infrastructure monitoring service 400. As illustrated in FIG. 4, the system architecture may include network attack functions 420 (interchangeably referred to as the threat feeds 420). The network attack functions may undergo offensive tests at 406 based at least in part on a previously derived or previously executed attack function permutation or a combination thereof. The threat feeds may further include attack function permutations comprising one or more attack payloads or the network attack function created by an artificial intelligence system and executed against a plurality of network elements at the application layer.

The network attack function 420 may be transmitted to targeted network elements, a frontend emulator at 410, and a vehicle emulator 416, a correlate service 412, and a Fleet Management System (FMS) 418. Once the network elements 410, 416 and correlate service 412 each receive the network attack function 420 from the offensive test 406, each of the network elements will be sent to a fleet management system 418 (a real backend), and the response 430 and 440 to the executed network attack functions 422 and 424 and returned to the frontend emulator 410. The responses 430 and 440 of the FMS 418 to the executed network attack functions 422 and 424 are received by the frontend emulator 410 and vehicle emulator 416 and transmitted to the correlation service 412. The correlation service 412 correlates or otherwise determines that the responses 430 and 440 to the executed network attack functions 422 and 424 from the frontend emulator at 410 and a vehicle emulator 416 are the result of the network attack function 420. For example, correlation or otherwise determining may be aided by use of a transaction ID and enriched data. An indication of the correlation 426 between the network attack function 420 and the emulated executed network attack functions 422 and 424 is returned to the results and analytics database 408. In some instances, the emulated executed network attack functions 422 and 424 and executed network attack function responses 430 and 440 of the fleet management system at 418 are provided to the correlation service 412. The executed network attack function permutation may be correlated 412 and emulated at both the frontend emulator 410 and the vehicle emulator 416. The indication of the correlation 426 may be stored in the results and analytics database 408. The indication of the correlation 426 results and contents of the analytics database at 408 may be displayed or otherwise analyzed by the analyst 402. While the present embodiment includes an emulated front end 410, an vehicle emulator, and real backend with vehicles 450 within the FMS 418, it will be appreciated that any combination of real and emulated vehicles 450, frontend, and backend are may be used to achieve and end-to-end a security testing platform 400.

Figure 5A:
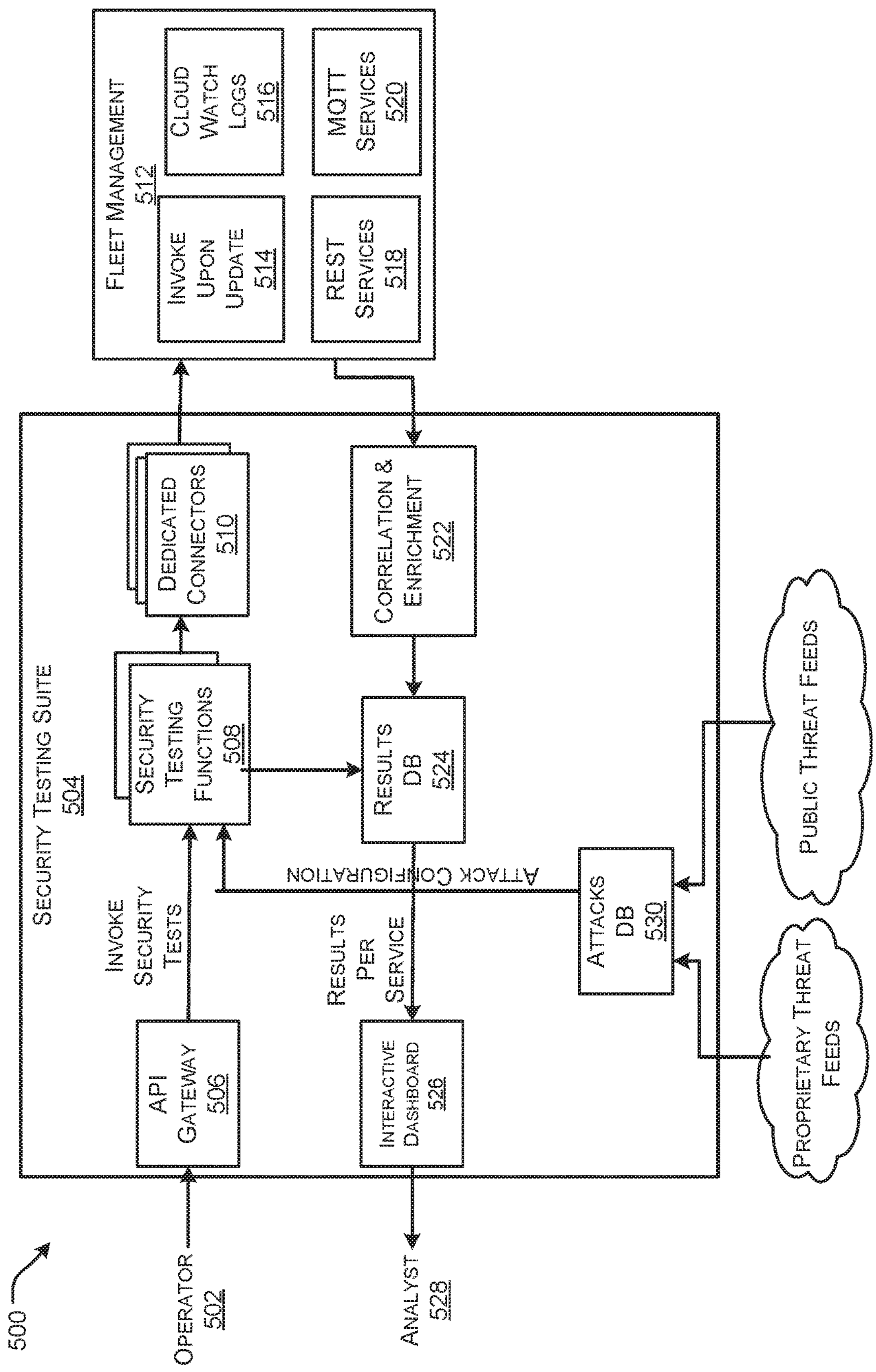
FIG. 5A depicts an additional system architecture for analyzing the results of network attack functions and methods.

FIG. 5A depicts an additional system architecture for analyzing the results of network attack functions and methods. According to FIG. 5A, the system architecture may comprise a web service such as an E2E security testing suit 504 that further may include an API gateway 506. The API Gateway 506 can interact with one or more network elements, the fleet management system 512 comprising one or more microservices that can interact with one or more network elements. The one or more microservices may include an Invoke upon update 514, Cloud watch logs 516, MQTT services 518, REST services 520 and the like. The network attack function permutation comprises at least one of a manual request from a human, an automated request according to a request schedule, an automated request generated by machine learning, and an artificial intelligence analysis. For example, the network attack functions (interchangeably referred to as the threat feeds) may be fed to the attack database 530 from an external computing environment including third party data sources such as public or proprietary threat feeds. The attack configuration from the attack database 530 may be then sent to the security testing functions 508 through the dedicated connectors 510 and finally to the fleet management system 512. The output data from the fleet management system 512, may be correlated and enriched at 522 and the correlated and enriched results may be stored in the result database 524. The result database may further store analyzed results from the security testing functions 508. The analyst at 528 may then analyze the results per service data from the results database at 524 through an interactive dashboard at 526.

Figure 5B:
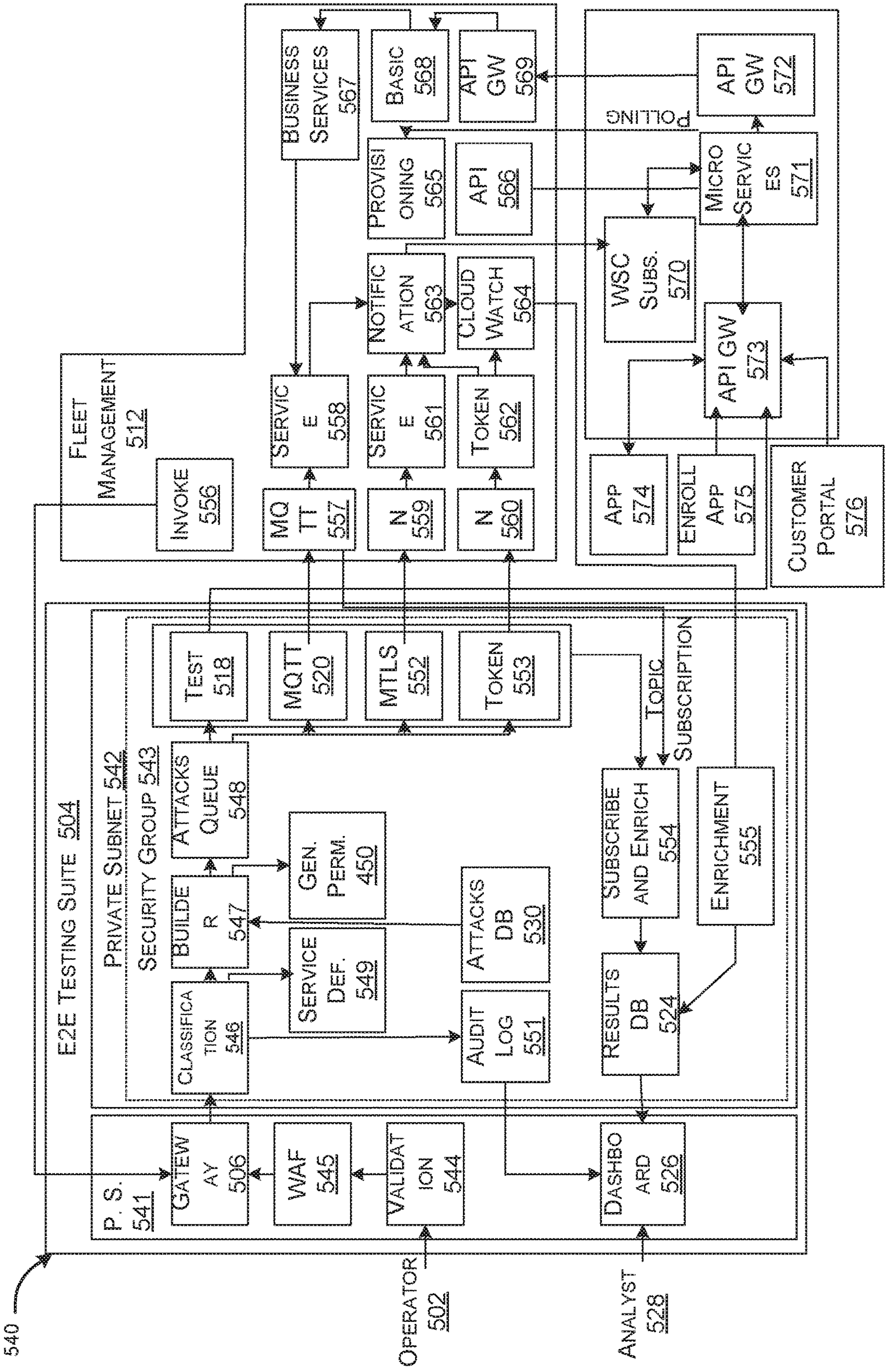
FIG. 5B depicts another detailed system architecture highlighting the functional components of the system.

FIG. 5B with reference to FIG. 5A depicts a more detailed system architecture highlighting the functional components of the system. As illustrated in FIG. 5B, the system architecture service such as the E2E security testing suit 504 include the API gateway 506 that can interact with one or more network elements, the fleet management system 512. The API Gateway 506 may verify: if a schema payload is of known generic type. For example, if the schema is a Protobuf, JSON schema and the like. The API Gateway may further verify if all parameters exist, and are fine and may also verify the source such as Mutual TLS. A classification block at 546 may classify data according to incoming schema, and service received from the API Gateway.

The service definitions at 549 may be used to store service definitions for schemas such as Protobufs, JSON schemas and the like. The service definitions at 549 may be checked in order to verify that the incoming schema is matching one that already exists in the schema definitions.

Additionally, the audit log at 551 may store alerts and actions needed by an analyst. For example, if a new schema definition is found then the audit log 551 may store the schema definition. The audit log at 551 may further audit access to the VCE.

Further, the dedicated payload builder at 547 may pull one or more attacks from the attacks database at 530, verify the existence of such attacks and fuzzed files in Generated Permutations at 450. The Generated Permutations at 450 may contain payloads of attacks (ready to send Protobufs, JSONs). The Generated Permutations at 450 may further perform pulling existing payloads to avoid recreating payloads and wasting time and resources, generating attack payloads such as Protobufs, JSONs and the like for any new or missing attacks and storing new payloads in Generic Permutations.

The attack database at 530 may contain attack configurations, dedicated attacks per service, declaration of fields that need to be fuzzed and fields that need to be kept as is. The attack database at 530 further may accept feeds from PT Integration Service (not shown in FIG. 5A or 5B).

The Attacks Queue by Topic SQS at 548 may store a combination of payload, endpoint, connector data but not limited to the like. Dedicated lambda connectors such as the REST services 518, Token services 553, TLS, MQTT service 558, HTTPS MTLS 561, IoT Hub Connector and the like are a set of separate Lambdas that can be used to communicate with different communication endpoints in the VCE such as the Fleet Management system, services platform, OEM, and the like.

An MQTT subscriber Lambda at 554 may be invoked whenever a response in MQTT is to be expected, for example when sending a REST payload to the Services Platform as a mobile application when the vehicle needs to get some command from the user. Additionally, an enrichment Lambda at 555 may be used to get feeds from different external systems and enrich existing result information such as information from Device Platform/Service Platform CloudWatch, X-Ray, MQTT Insights, and the like.

The result database at 524 may store all attack results and insights connected to them, store enrichment information, may query the attacks stored based on timestamps and transaction IDs and supply the end feeds for the Kibana. Additionally, the interactive dashboard at 526 may be used to view alerts, view results, contains dashboards and may have classification and reporting capabilities and the like.

Figure 6A:
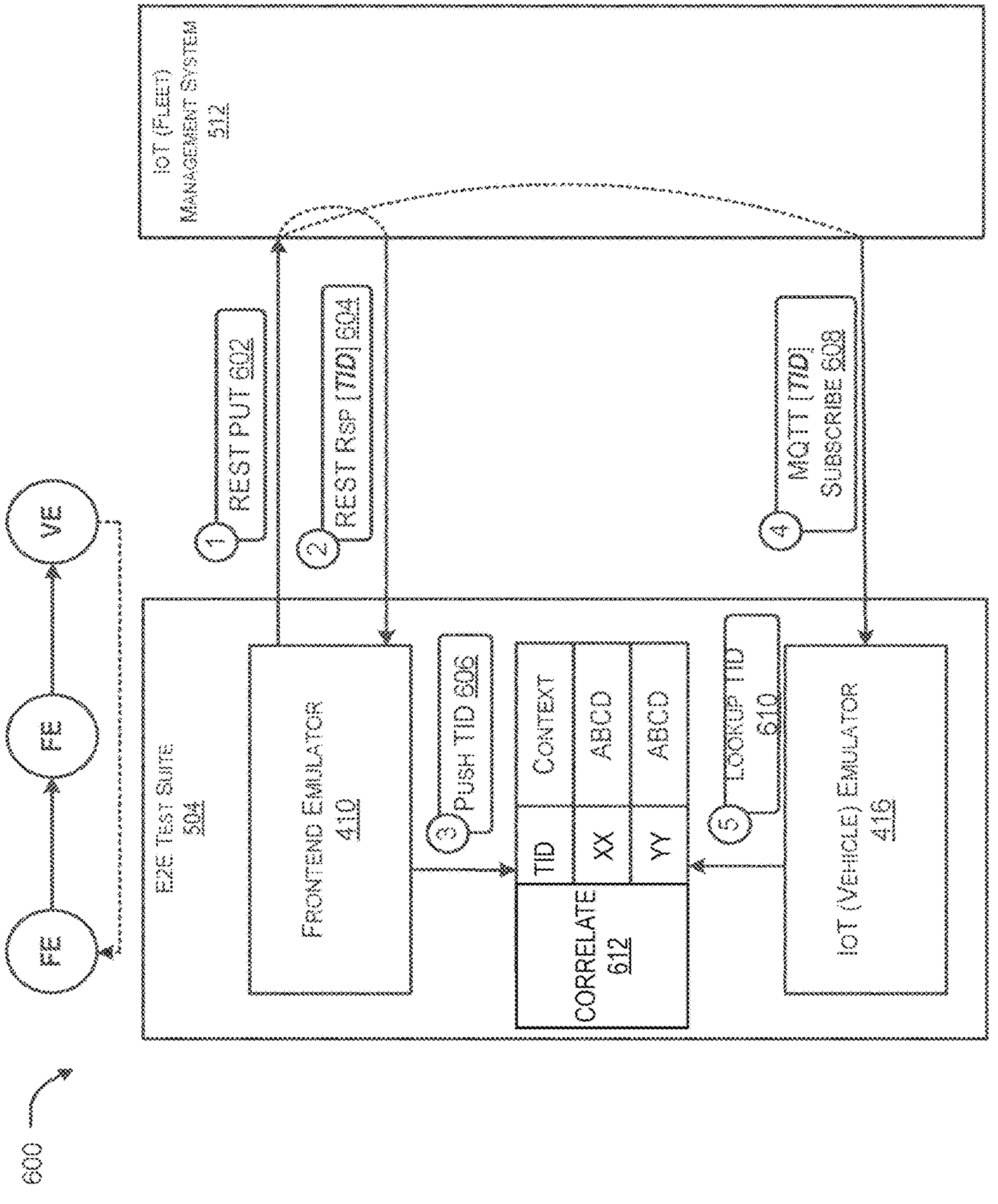
FIGS. 6A-6B depict example representations of operational process flow within the system architecture.
Figure 6B:
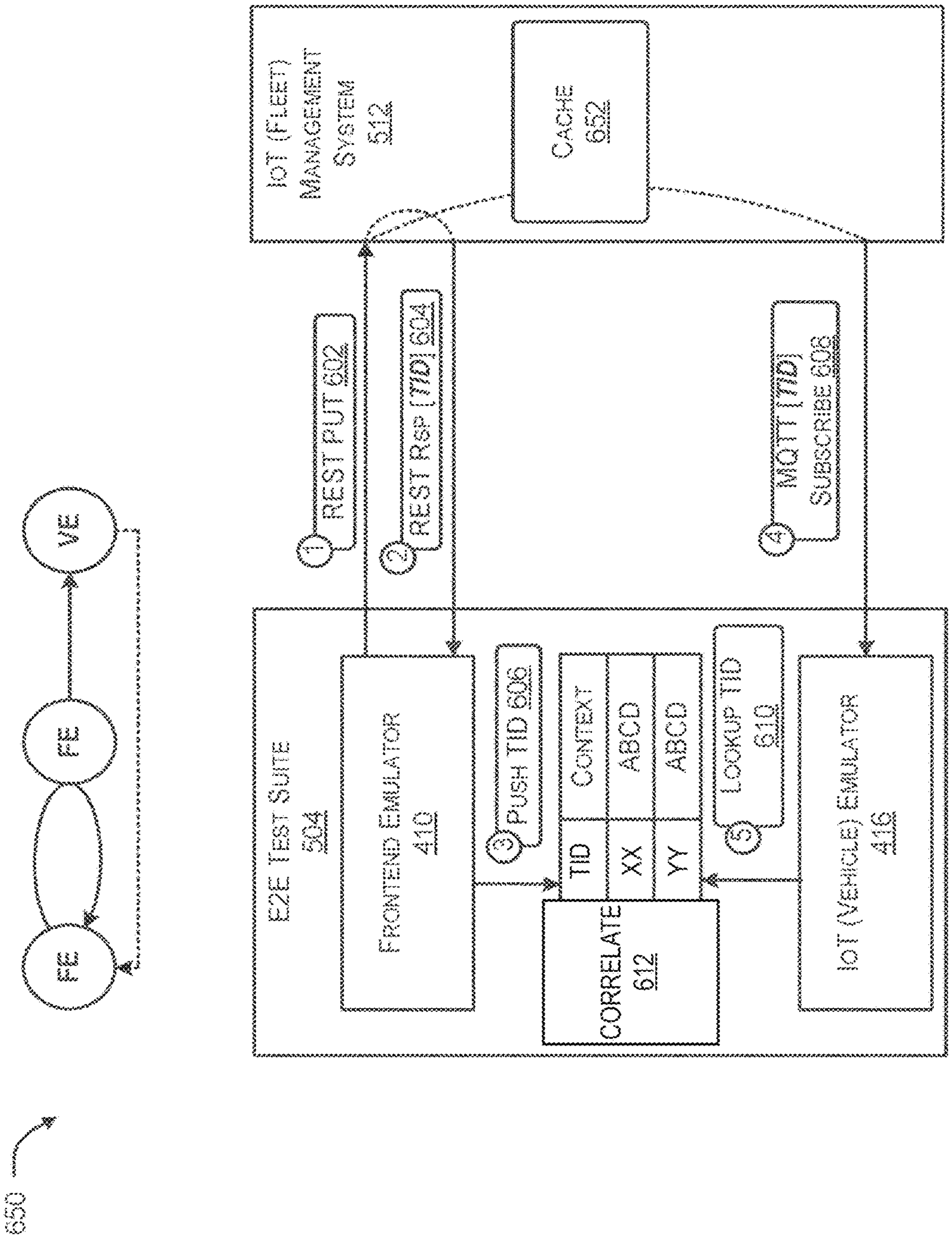

FIGS. 6A-6B depict example representations of operational process flow within the system architecture in the vehicular computing environment. According to FIG. 6A, the at least one attack function may utilize a communication protocol and a web service protocol but not limited to the like. The communication protocol may be full-duplex, stateless but not limited to the like while the web services protocol may be full-duplex but not limited to it. For example, the communication protocol may provide communication between the E2E testing suite 504 and the backend service fleet management system 512. Prior to establishing the communication to send commands to the fleet management system, the system may create a micro service such as an MQTT client that subscribes to all relevant topics. The Frontend Emulator (FE) 410 may craft a command payload and invoke the REST function REST PUT at 602. The REST function may return a response result which may be received from the Fleet Management System such as a HTTP200 with Transaction ID (TID), HTTP404, and the like. The correlation table 612 may include previously obtained correlation results that may indicate the relevance of at least one of a cross-site scripting attack, and out of range integer value, a JSON injection, an enormous field repetition, a specially crafted string, a nullbyte, an SQL injection, an illegal character, or a business logic attack. In case the REST response is positive (HTTP200), the frontend emulator 410 may store the TID of the response in a Correlation table 612 along with the parameters of the original crafted command.

The MQTT subscriber notifies the Vehicle Emulator (VE) 416 upon receiving an MQTT message. The TID conveyed by the MQTT message is looked up in Correlation table 612. If the same TID is matched, the original command parameters are fetched for further validation from the Correlation table 612.

FIG. 6B illustrates another embodiment of the communication between the frontend and the backend services. As illustrated, the vehicle emulator 416 may craft the MQTT Publish payload, generate the Transaction ID (TID) at 604 and insert the TID at 606 into the TID field of the crafted payload. The generated TID may be stored in the Correlation table 612 along with MQTT Publish command parameters.

The Frontend Emulator 410 may issue the REST GET request to a relevant service of the Fleet Management System to obtain the parameters published by the vehicle emulator 416 in and temporarily store in a Management System Cache 652 (or simply referred to as cache 652). Upon getting the response, the FE 410 parses the response payload and fetches the TID. The TID may be looked up in the Correlation table. If the same TID is matched, the original MQTT Publish command parameters are fetched from the Correlation table for further validation and comparison.

Figure 7A:
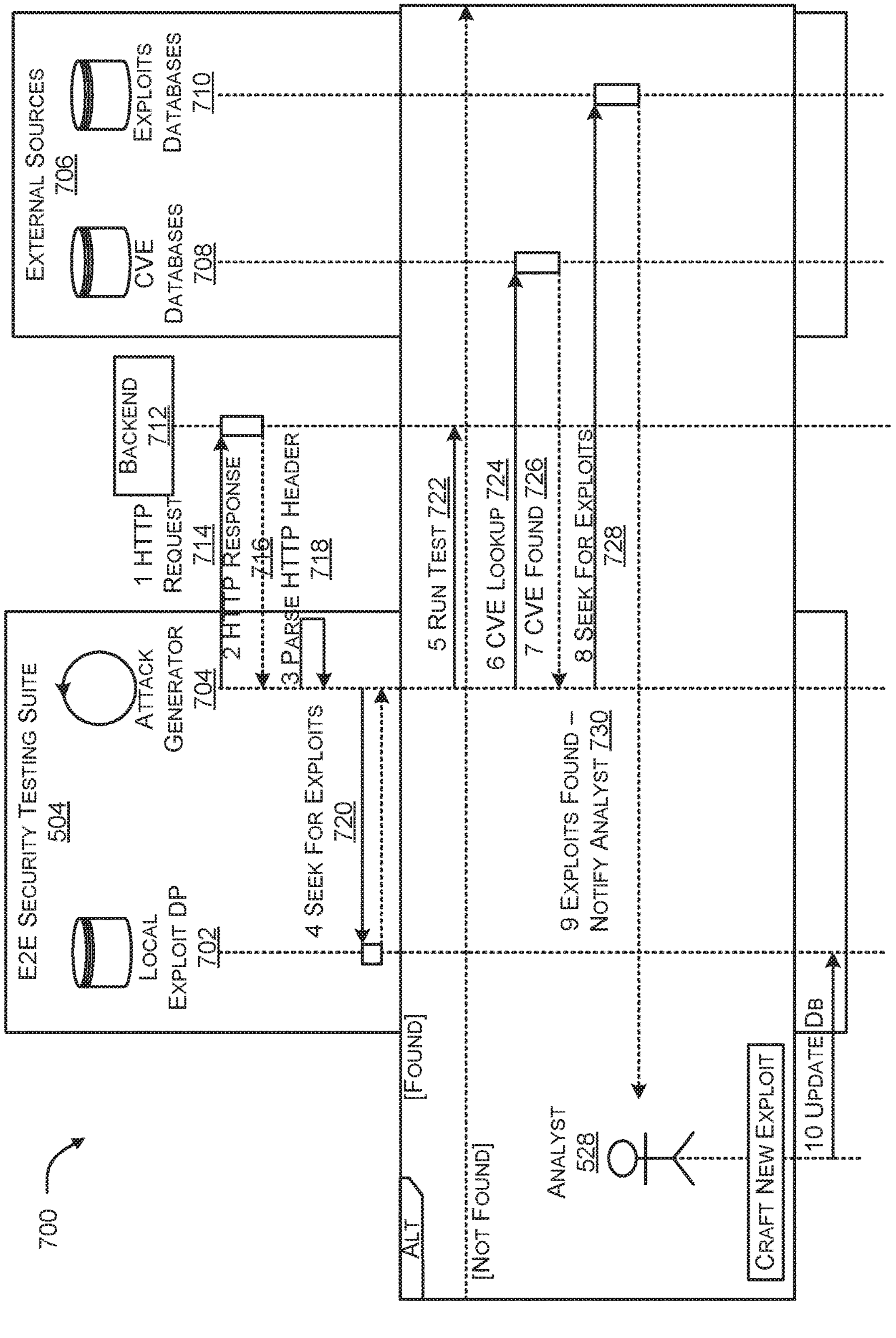
FIGS. 7A-7B depict example representations of attack generation process flow within the system architecture.
Figure 7B:
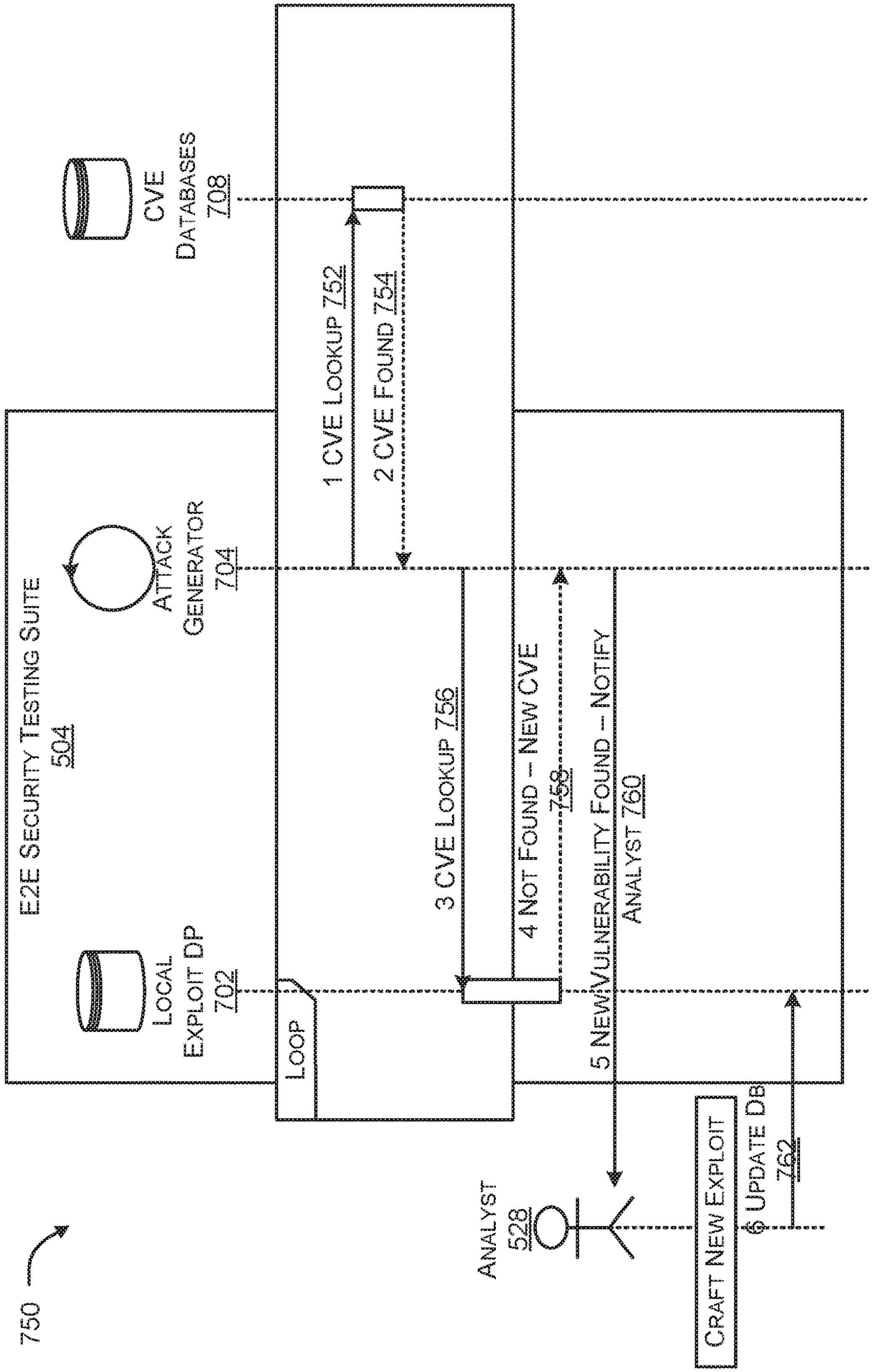

FIGS. 7A-7B depict example representations of attack generation process flow within the system architecture in the vehicular computing environment. As illustrated in FIG. 7A, in an embodiment, the attack generation process flow may include utilizing a communication protocol or a web services protocol or a combination thereof and interact with at least one of a private database, a public database, or a network element-specific database. For example, at 714 to 718, attack generation process flow may include attempting to retrieve software version from HTTP header and at 720 to 724 running tests corresponding to the retrieved software version. At 726 to 730, the attack generation process flow may include seeking exploits from an exploit database that may be a database external to the vehicle computing environment while at 732 and 734, the attack generation process flow may include notifying the analyst about new exploits found, crafts new tests based on the new exploits, and updates the exploits database that may include previously obtained correlation results related to a network element. The previously obtained correlation results may indicate the relevance of at least one of a cross-site scripting attack, and out of range integer value, a JSON injection, an enormous field repetition, a specially crafted string, a nullbyte, an SQL injection, an illegal character, or a business logic attack.

FIG. 7B illustrates another embodiment, wherein at 736 and 738, the attack generation process flow may include periodically polling external Common Vulnerabilities and Exposures (CVE) databases for new vulnerabilities relevant for the system. The CVE lookup expression may be derived from the list of potentially harmful payloads types. Alternatively the CVE lookup may be triggered by a desire to investigate an anomalous network behavior anything related to bad parsing, the presence of certain packages, or new payloads, received responses or may emerge from new learnings gleaned from polling the system. For example, a CVE lookup may be triggered upon receiving a response indicating a new parser was used, or an unexpected webserver was activated.

The attack generation process flow may include at 740 and 742 checking if found vulnerabilities are known by the system that may exist in a local exploits database and at 744 and 746, if vulnerabilities not found, notifying the analyst about new vulnerabilities found, crafts corresponding exploit/test and updates the local Exploits Database. Known system exploits may be held in a network connected CVE database, for example the National Vulnerability Database (NVD). Additional non-limiting examples of CVE databases include Exploits DB, Shodan, and Metasploit.

Figure 8:
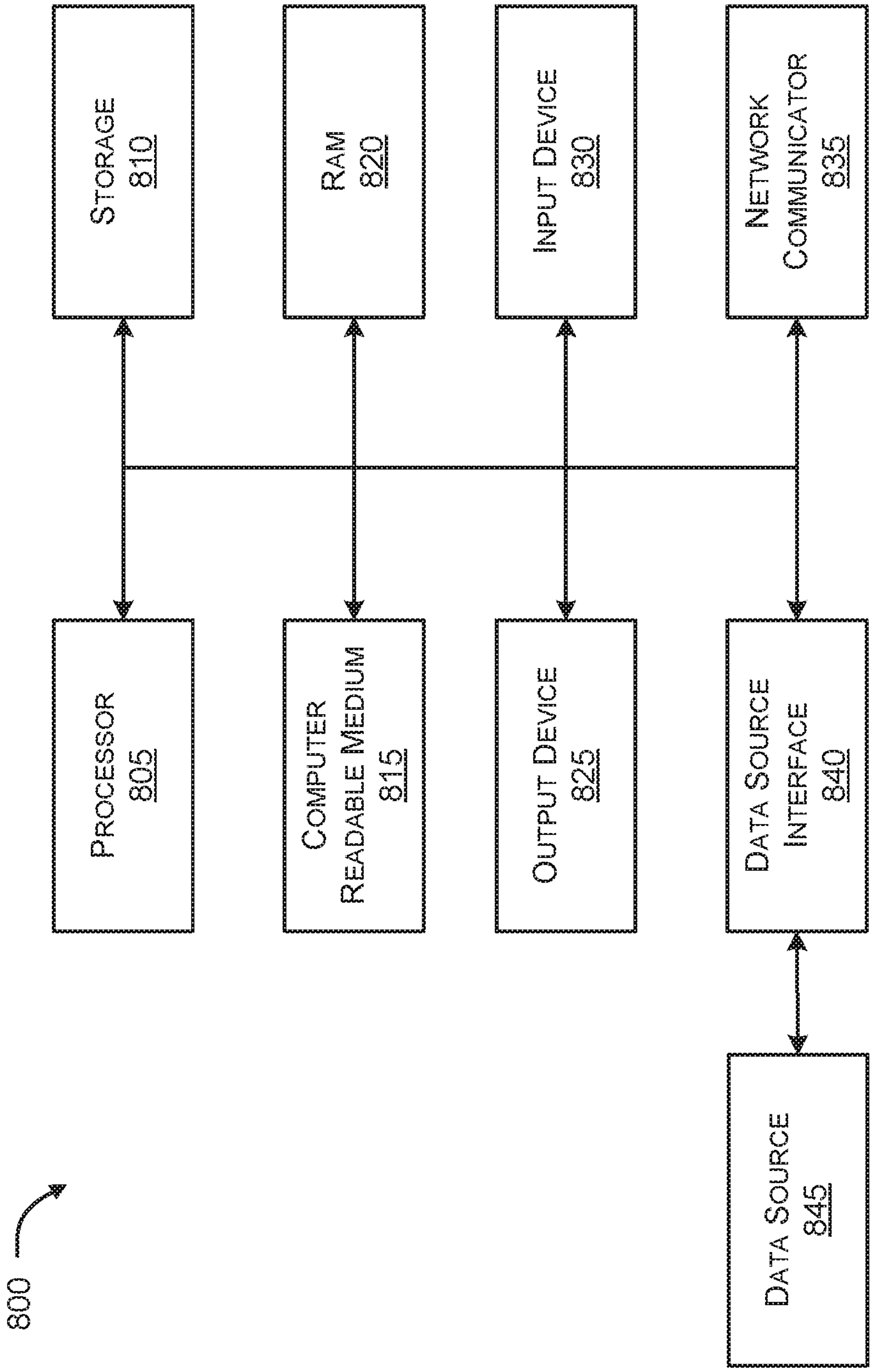
FIG. 8 illustrates a hardware platform for implementation of the system, according to an example embodiment of the present disclosure.

FIG. 8 illustrates a hardware platform for implementation of the system, according to an example embodiment of the present disclosure.

Over FIG. 8, the hardware platform 800 may be a computer system 800 that may be used with the examples described herein. The computer system 800 may represent a computational platform that includes components that may be in a server or another computer system. The computer system 800 may execute, by a processor (e.g., a single or multiple processors) or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 800 may include a processor 805 that executes software instructions or code stored on a non-transitory computer-readable storage medium 810 to perform methods of the present disclosure. The software code includes, for example, instructions to gather information pertaining cyber anomalies and data elements in a vehicular computing environment and generate alerts, based on risk assessment of the vehicular computing environment.

The instructions on the computer-readable storage medium 810 are read and stored the instructions in storage 815 or in random access memory (RAM) 820. The storage 815 provides a large space for keeping static data where at least some instructions could be stored for later execution. The stored instructions may be further compiled to generate other representations of the instructions and dynamically stored in the RAM 820. The processor 805 reads instructions from the RAM 820 and performs actions as instructed.

The computer system 800 further includes an output device 825 to provide at least some of the results of the execution as output including, but not limited to, visual information to users, such as external agents. The output device can include a display on computing devices and virtual reality glasses or may be an interactive dashboard. For example, the display can be a mobile phone screen or a laptop screen. GUIs and/or text are presented as an output on the display screen. The computer system 800 further includes input device 830 to provide a user or another device with mechanisms for entering data and/or otherwise interact with the computer system 800. The input device may include, for example, a keyboard, a keypad, a mouse, or a touchscreen. In an example, output of any of the attach generator, the data lake, the machine learning engine may be displayed on the output device 825. Each of these output devices 825 and input devices 830 could be joined by one or more additional peripherals. In an example, the output device 825 may be used to provide alerts or display a risk assessment map of the environment.

A network communicator 835 may be provided to connect the computer system 800 to a network and in turn to other devices connected to the network including other clients, servers, data stores, and interfaces, for instance. A network communicator 835 may include, for example, a network adapter such as a LAN adapter or a wireless adapter. The computer system 800 includes a data source interface 840 to access data source 845. A data source is an information resource. As an example, a database of exceptions and rules may be a data source. Moreover, knowledge repositories and curated data may be other examples of data sources.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

Those having ordinary skill in the art will recognize that the state of the art has progressed to the point where there is little distinction left between hardware, software, and/or firmware implementations of aspects of systems; the use of hardware, software, and/or firmware is generally a design choice representing cost vs. efficiency tradeoffs (but not always, in that in certain contexts the choice between hardware and software can become significant). Those having ordinary skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

In some implementations described herein, logic and similar implementations may include software or other control structures suitable to operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise controlling special-purpose components. Specifications or other implementations may be transmitted by one or more instances of tangible or transitory transmission media as described herein, optionally by packet transmission or otherwise by passing through distributed media at various times.

Alternatively or additionally, implementations may include executing a special-purpose instruction sequence or otherwise operating circuitry for enabling, triggering, coordinating, requesting, or otherwise causing one or more occurrences of any functional operations described above. In some variants, operational or other logical descriptions herein may be expressed directly as source code and compiled or otherwise expressed as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar modes of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those having ordinary skill in the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a USB drive, a solid state memory device, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read-only, etc.)), and/or electrical circuitry forming a communications device (e.g., a modem, communications switch, optical-electrical equipment, etc.). Those having ordinary skill in the art will recognize that the subject matter described herein may be implemented in an analog or digital fashion or some combination thereof.

Those skilled in the art will recognize that at least a portion of the devices and/or processes described herein can be integrated into a data processing system. Those having ordinary skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

In certain cases, use of a system or method as disclosed and claimed herein may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory.

Further, implementation of at least part of a system for performing a method in one territory does not preclude use of the system in another territory.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

One skilled in the art will recognize that the herein described components (e.g., operations), devices, objects, and the discussion accompanying them are used as examples for the sake of conceptual clarity and that various configuration modifications are contemplated. Consequently, as used herein, the specific examples set forth and the accompanying discussion are intended to be representative of their more general classes. In general, use of any specific example is intended to be representative of its class, and the non-inclusion of specific components (e.g., operations), devices, and objects should not be taken to be limiting.

With respect to the use of substantially any plural and/or singular terms herein, those having ordinary skill in the art can translate from the plural to the singular or from the singular to the plural as is appropriate to the context or application. The various singular/plural permutations are not expressly set forth herein for sake of clarity.

The herein described subject matter sometimes illustrates different components contained within, or connected with, different other components. It is to be understood that such depicted architectures are presented merely as examples, and that in fact many other architectures may be implemented which achieve the same functionality. In a conceptual sense, any arrangement of components to achieve the same functionality is effectively "associated" such that the desired functionality is achieved. Therefore, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of "operably couplable" include but are not limited to physically mateable or physically interacting components, wirelessly interactable components, wirelessly interacting components, logically interacting components, or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components, inactive-state components, or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such a recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having ordinary skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having ordinary skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented as sequences of operations, it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What we claim is:

1. A method of analyzing the results of a network attack function within a vehicular computing environment including a plurality of network elements each with at least one known parameter, the method comprising:

a. executing one or more network attack functions against at least two of the plurality of network elements, wherein the one or more network attack functions includes a set of attack function permutations;

b. analyzing results of at least one network attack function to identify anomalous behavior of at least one network element; and c. correlating the identified anomalous behavior of the at least one network element with a specific network attack function permutation and with at least one parameter of the specific network element.

2. The method of claim 1, wherein the plurality of network elements reside in a hybrid environment, wherein the hybrid environment comprises at least a combination of at least two of a physical network elements, simulated network elements, or emulated network elements.

3. The method of claim 1, wherein the plurality of network elements includes at least one backend service.

4. The method of claim 1, wherein the plurality of network elements includes at least one web service.

5. The method of claim 1, further comprising connection with an external computing environment.

6. The method of claim 1, wherein an executed attack function permutation comprises at least one of a manual request from a human, an automated request according to a request schedule, an automated request generated by machine learning, and an artificial intelligence analysis.

7. The method of claim 1, wherein the at least one attack function permutation comprises a logical addresses for each of the plurality of network elements.

8. The method of claim 1, wherein the at least one attack function permutation comprises at least one characteristic for each of the plurality of network elements.

9. The method of claim 1, wherein the at least one attack function permutation comprises at least one of a duration of time to form at least one attack function, a predicted run time to execute at least one attack function, a requirement to comply with a performance specification of an attack function, or an attack function network route.

10. The method of claim 1, wherein the at least one network attack function is based at least in part on a previously derived attack function permutation.

11. The method of claim 1, wherein the network attack function was created by an artificial intelligence system.

12. The method of claim 1, wherein the network attack function includes randomly generated information.

13. The method of claim 1, wherein the at least one network attack function utilizes a web services protocol.

14. The method of claim 1, wherein the at least one network attack function permutation comprises interaction with at least one of a private database, a public database, or a network element-specific database.

15. The method of claim 1, wherein the at least one network attack function permutation is at least partially informed by previously obtained correlation results related to a network element.

16. The method of claim 1, wherein analyzing the results of at least one attack function includes the use of a supervised learning operation.

17. The method of claim 1, wherein correlating the identified anomalous behavior includes the use of a set of predefined and updatable rules to detect anomalous behavior.

18. The method of claim 1, wherein correlating the identified anomalous behavior includes transferring results of the correlating to one or more network elements within a vehicular computing environment.

19. The method of claim 1, wherein correlating the identified anomalous behavior includes sending results of correlation activity to an attack function generator.

20. The method of claim 19 wherein sending the results of the correlation activity to an attack function generator results in generation of an additional attack function permutation.

* * * * *